United States Patent
Deng et al.

(10) Patent No.: US 11,279,269 B1
(45) Date of Patent: Mar. 22, 2022

(54) ARMREST ASSEMBLY MOVEABLE BETWEEN RAISED AND LOWERED POSITIONS

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 69 days.

(21) Appl. No.: 17/029,687

(22) Filed: Sep. 23, 2020

(51) Int. Cl.
| | |
|---|---|
| *B60N 2/75* | (2018.01) |
| *B60N 2/42* | (2006.01) |
| *B60N 2/427* | (2006.01) |
| *B60R 21/02* | (2006.01) |

(52) U.S. Cl.
CPC ....... *B60N 2/4235* (2013.01); *B60N 2/42727* (2013.01); *B60N 2/42781* (2013.01); *B60N 2/753* (2018.02); *B60R 21/02* (2013.01); *B60R 2021/0273* (2013.01)

(58) Field of Classification Search
CPC .. B60N 2/4235; B60N 2/753; B60N 2/42727; B60N 2/42781; B60R 21/02; B60R 2021/0273
See application file for complete search history.

(56) References Cited

U.S. PATENT DOCUMENTS

| | | | |
|---|---|---|---|
| 9,216,665 B2 | 12/2015 | Herault | |
| 9,434,340 B2 * | 9/2016 | Egusa | B60R 21/02 |
| 9,573,497 B2 * | 2/2017 | Jaradi | B60N 2/4207 |
| 9,738,188 B2 * | 8/2017 | Honda | B60R 21/207 |
| 9,809,173 B2 | 11/2017 | Mather et al. | |
| 10,035,441 B1 * | 7/2018 | Patel | B60R 22/1952 |
| 10,112,516 B2 * | 10/2018 | Sundararajan | B60N 2/0232 |
| 10,525,893 B2 | 1/2020 | Lind | |
| 2012/0286537 A1 * | 11/2012 | Flamard | B60N 2/4235 296/1.09 |
| 2018/0304787 A1 * | 10/2018 | Gazes | B60N 2/753 |
| 2019/0106077 A1 * | 4/2019 | Dry | B60R 21/215 |
| 2019/0389350 A1 | 12/2019 | Dry et al. | |

* cited by examiner

*Primary Examiner* — Philip F Gabler
(74) *Attorney, Agent, or Firm* — Frank A. MacKenzie; Bejin Bieneman PLC

(57) ABSTRACT

A seat for a vehicle includes a seat back and a seat bottom extending from the seat back along a seat-bottom axis. A track is fixed relative to the seat bottom and is elongated along the seat-bottom axis. A slider is slidably engaged with the track along the seat-bottom axis. A link is pivotally engaged with the slider. An armrest is pivotally engaged with the link. A pyrotechnic actuator connected to the slider. In the event of a sensed vehicle impact, the pyrotechnic actuator pulls the slider to move the armrest to a raised position.

15 Claims, 6 Drawing Sheets

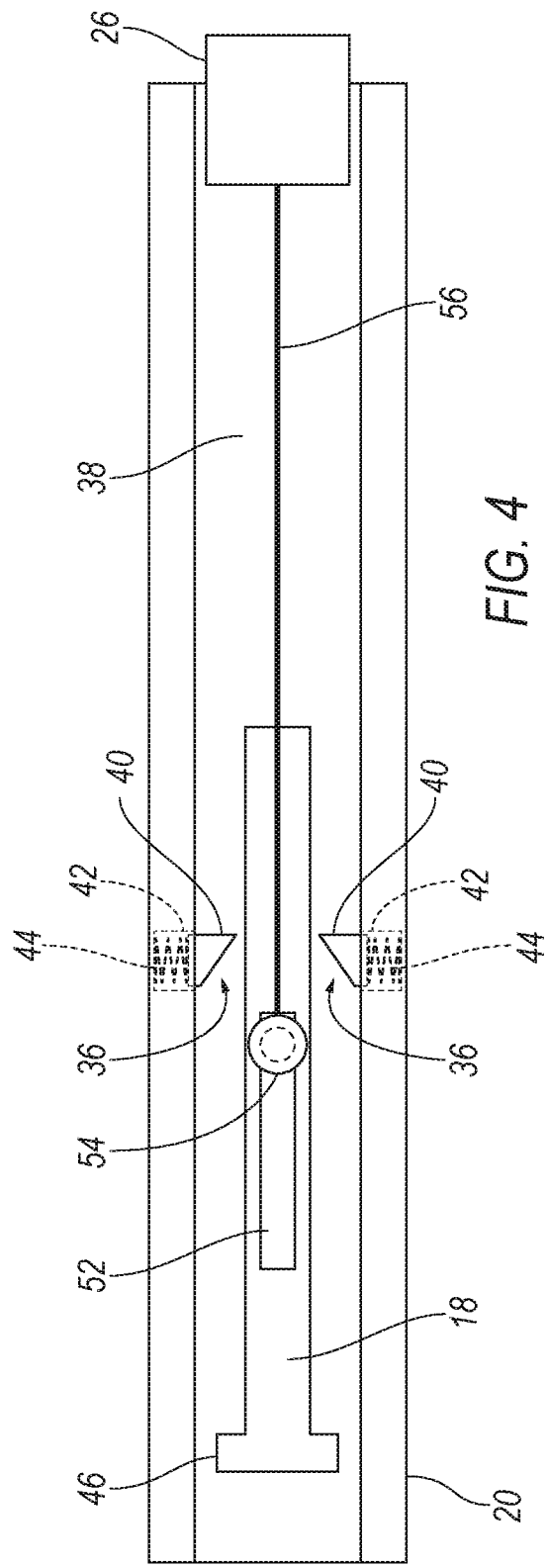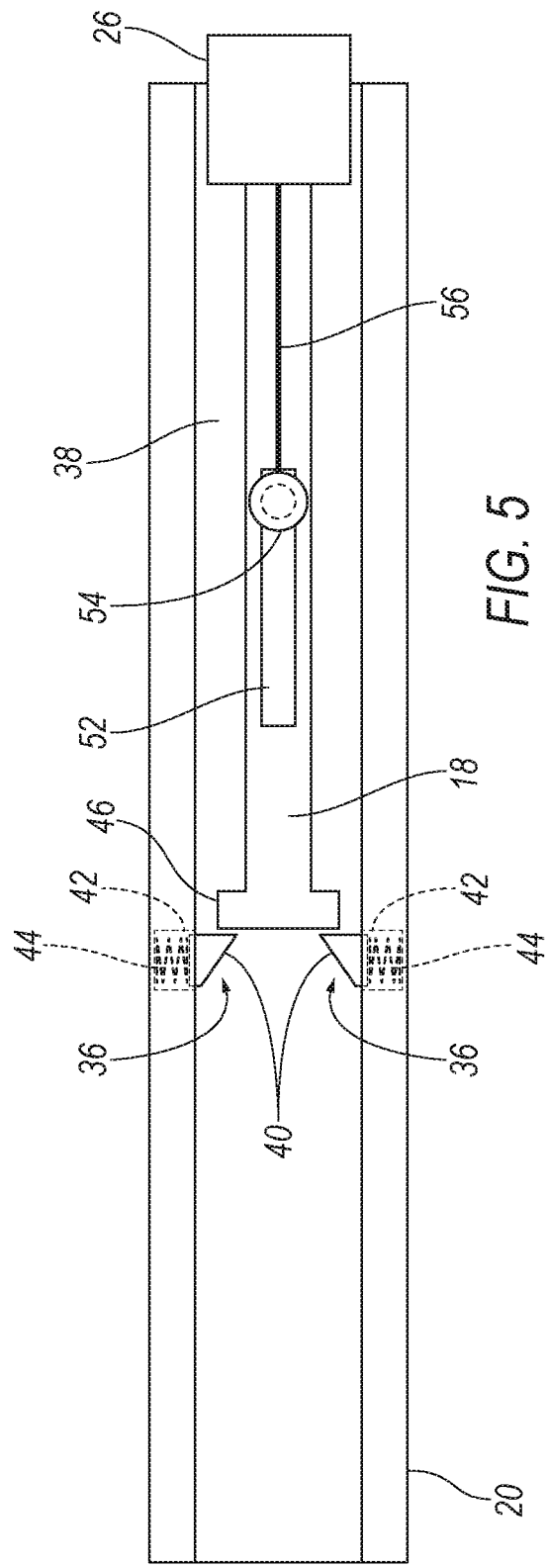

ARMREST ASSEMBLY MOVEABLE BETWEEN RAISED AND LOWERED POSITIONS

BACKGROUND

Vehicles may be subject to impact testing standards to assess safety measures for occupants. As one example, the National Highway Traffic Safety Administration (NHTSA) provides a test procedure designed to simulate a vehicle experiencing a side collision with a pole. The NHTSA procedure provides that a test vehicle holding a test dummy as an occupant collides sideways at 20 miles per hour into a rigid vertical pole 10 inches in diameter. The procedures may measure the effects on anthropomorphic test devices simulating occupants in different positions in a vehicle.

BRIEF DESCRIPTION OF THE DRAWINGS

FIG. 4 is a top view of a track, a slider in in a rearward position, and a pyrotechnic actuator connected to the slider.

FIG. 5 is the top view of FIG. 4 with the slider in a forward position.

DETAILED DESCRIPTION

Figure 1:
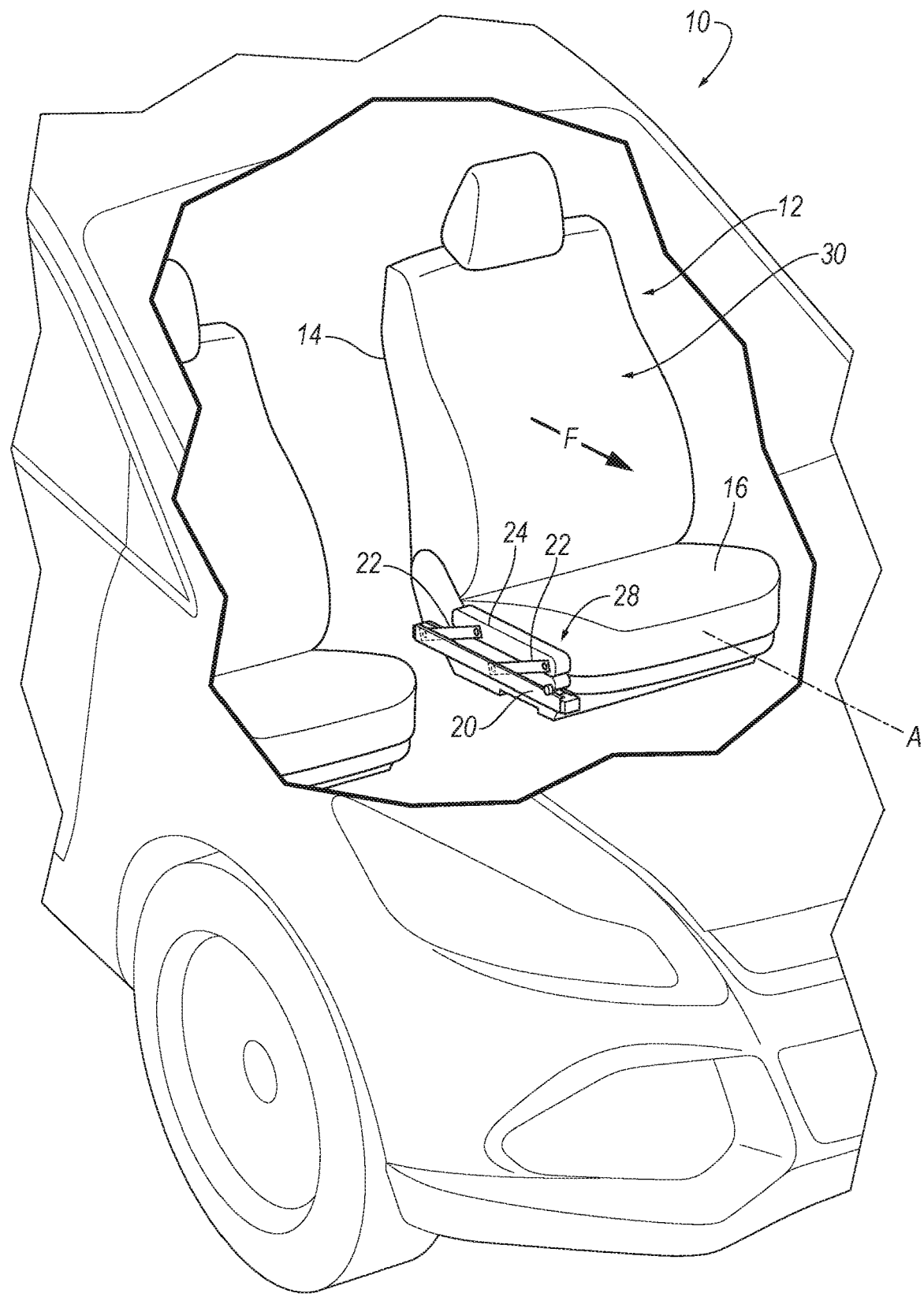
FIG. 1 is a cutaway view of a vehicle including two seats with no center console between the two seats.

A seat includes a seat back and a seat bottom extending from the seat back along a seat-bottom axis. A track is fixed relative to the seat bottom and is elongated along the seat-bottom axis. A slider is slidably engaged with the track along the seat-bottom axis. A link is pivotally engaged with the slider. An armrest is pivotally engaged with the link. A pyrotechnic actuator connected to the slider.

The seat may include second link pivotally engaged with the slider and the armrest. The second link is in a seat-forward direction of the first link at the slider and at the armrest.

The seat may include a pivotable joint between the link and one of the slider and the armrest. The link may be pivotable about the pivotable joint between a lowered position and an upright position, the pivotable joint having stopping surfaces spaced from each other when the link is in the lowered position and abutting each other when the link is in the upright position. One of the stopping surfaces may be fixed relative to the link and the other of the stopping surfaces may be fixed relative to the one of the slider and the armrest.

The link may be movable with the slider on a path along the seat-bottom axis, and the seat may include a pin fixed relative to the track on the path in a seat-forward direction of the link. The seat may include a pivotable joint between the link and one of the slider and the armrest, the pivotable joint having stopping surfaces. The stopping surfaces may be spaced from each other when the link is spaced from the pin and the stopping surfaces abutting each other when the link abuts the pin. The seat may include a locking tab releasably extending from the track toward the slider, the slider including a protrusion. The protrusion may be in a seat-rearward direction of the locking tab when the link is spaced from the pin. The locking tab may be in a seat-forward direction of the protrusion when the link abuts the pin.

The seat may include a locking tab releasably extending from the track toward the slider. The locking tab may be releasably engaged with the slider when the slider is in a forward position and the locking tab may be disengaged with the slider when the slider is in a rearward position.

The slider defines a slot and the pyrotechnic actuator has an anchor moveably retained in the slot.

The seat may include a net extending from the seat bottom to the armrest.

The slider may be slidable along the track between a forward position and a rearward position. The link may be upright when the slider is in the forward position and the link may be in a lowered position when the slider is in the rearward position.

The armrest may be generally horizontal when the slider is in the forward position.

The armrest may be generally horizontal when the slider is in the rearward position.

The armrest may be in a raised position when the link is in the upright position and the armrest is below the raised position when the link is in the lowered position.

With reference to the Figures, wherein like numerals indicate like parts throughout the several views, a seat 12 for a vehicle 10 is generally shown. The seat 12 includes a seat back 14 and a seat bottom 16 extending from the seat back 14 along a seat-bottom axis A. The seat 12 includes a track 20 fixed relative to the seat bottom 16 and elongated along the seat-bottom axis A. A slider 18 is slidably engaged with the track 20 along the seat-bottom axis A. A link 22 is pivotally engaged with the slider 18. An armrest 24 is pivotally engaged with the link 22. A pyrotechnic actuator 26 is connected to the slider 18.

Figure 2:
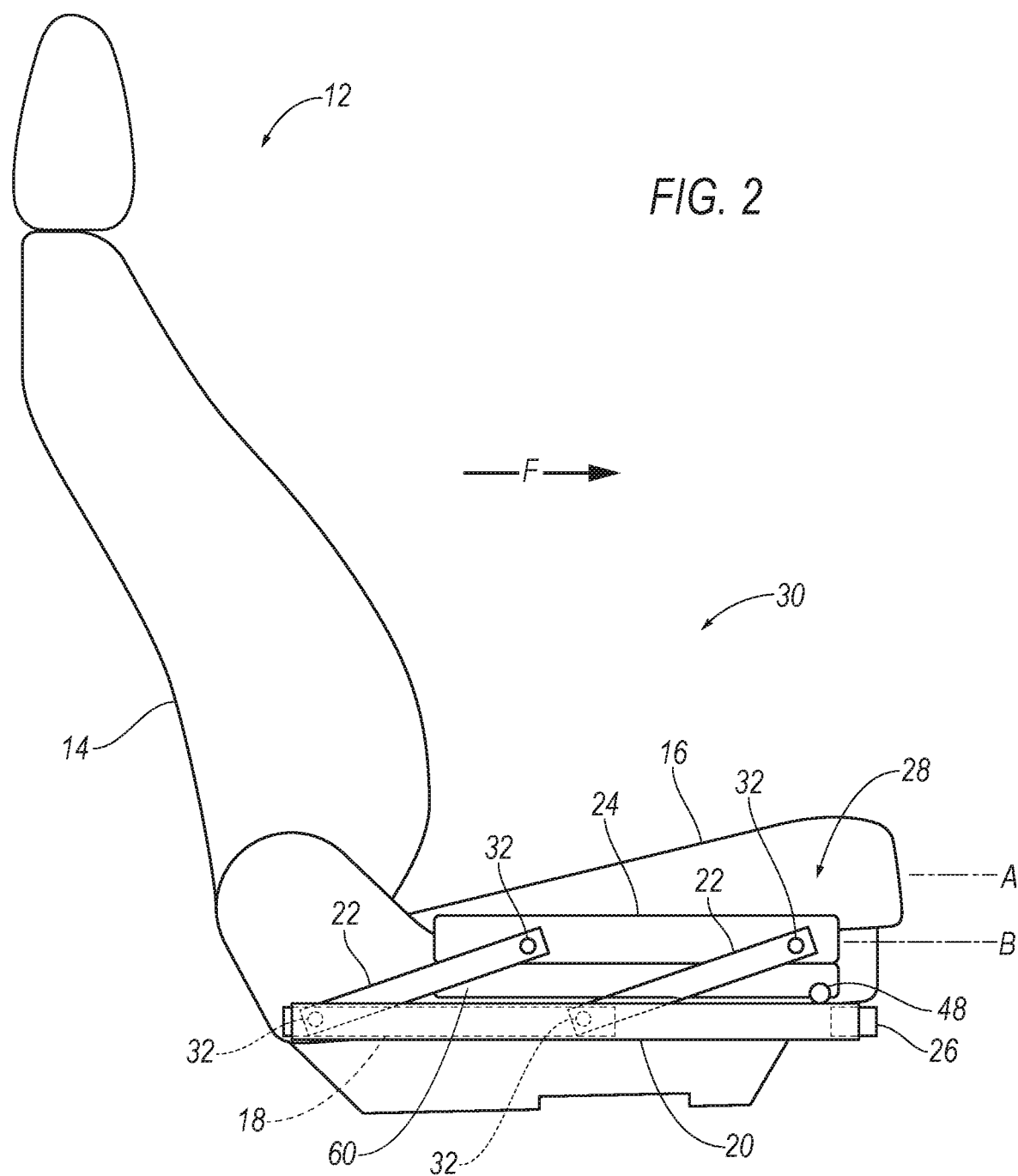
FIG. 2 is a side view of one of the seats with an armrest assembly in a lowered position.
Figure 3:
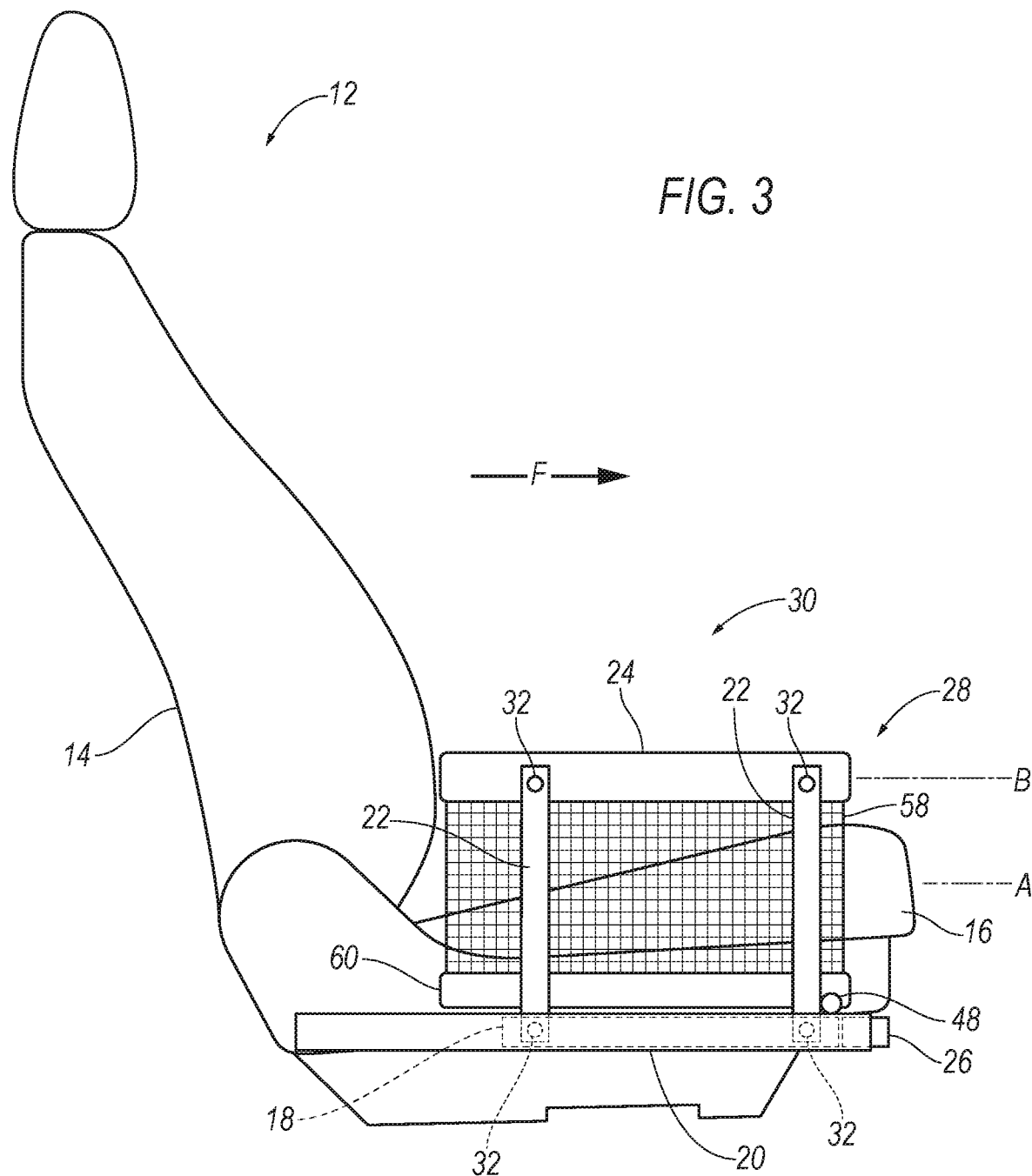
FIG. 3 is the seat of FIG. 2 with the armrest assembly in the raised position.

The armrest 24 may be raised and lowered relative to the seat bottom 16. Specifically, the armrest 24 may be selectively raised to a raised position (as shown in FIG. 3) and lowered to a lowered position (as shown in FIG. 2) manually by an occupant of the seat 12 or may be automatically raised to the raised position by actuation of the pyrotechnic actuator 26 (the actuation of the pyrotechnic actuator 26 being shown in FIG. 5) in the event of a vehicle impact. In the raised position, the armrest 24 can support the arm of an occupant so that, for example, an occupant may comfortably rest an arm on the armrest 24. In the event of a vehicle impact, the armrest 24 in the raised position acts as a reaction surface for an occupant in the event of a vehicle impact that urges the occupant toward the armrest 24. Accordingly, the seat 12 including the armrest 24 may be beneficial, for example, in a vehicle 10 that does not include a center console that would otherwise operate as a reaction surface in the event of a vehicle impact.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from a driver, i.e., the vehicle 10 may be self-driving without human input.

The vehicle 10 includes a passenger cabin (not numbered) to house occupants, if any, of the vehicle 10. The passenger cabin may extend across the vehicle 10, i.e., from one side to the other side of the vehicle 10. The passenger cabin includes a front end and a rear end with the front end being in front of the rear end during forward movement of the vehicle 10.

The vehicle 10 includes at least one seat 12 disposed in the passenger cabin. Specifically, the vehicle 10 may include any suitable number of seats 12 arranged in any suitable arrangement in the passenger cabin. The seats 12 shown in FIG. 1 are front seats 12. As another example, the seats 12 may be rear seats located rearward in the passenger cabin, e.g., in a second row of seats, a third row of seats, etc. Said differently, one or more seats 12 including an armrest assembly 28 may be at any suitable position in the vehicle 10. The vehicle 10 may include other seats 12 that do not include the armrest assembly 28.

As shown in FIGS. 2-5, the seats 12, are supported by a floor of the vehicle 10. The seat back 14 may be supported by the seat bottom 16. The seat bottom 16 extends from the seat back 14 along the seat-bottom axis A. Specifically, the seat bottom 16 may extend a vehicle-forward direction along the seat-bottom axis A. The seat-bottom axis A may be parallel to the longitudinal axis of the vehicle 10, i.e., the seat-bottom axis A may extend in a vehicle-for-and-aft direction. The seat bottom 16 may be elongated along the seat-bottom axis A.

The seat back 14 may be stationary or movable relative to the seat bottom 16. The seat back 14 and the seat bottom 16 may be adjustable in multiple degrees of freedom. Specifically, the seat back 14 and the seat bottom 16 may themselves be adjustable, in other words, adjustable components within the seat back 14 and/or the seat bottom 16, and/or may be adjustable relative to each other.

The seat back 14 and the seat bottom 16 may each include a frame (not numbered) and a covering (not numbered) supported on the frame. The frame may include tubes, beams, etc. The frame may be of any suitable material, e.g., plastic such as carbon fiber reinforced plastic (CFRP), glass fiber-reinforced semi-finished thermoplastic composite (organosheet), etc.; and/or metal such as steel, aluminum, etc. The covering may include upholstery and padding. The upholstery may be cloth, leather, faux leather, or any other suitable material. The upholstery may be stitched in panels around the frame. The padding may be between the covering and the seat 12 back frame and may be foam or any other suitable material.

The seat 12 defines an occupant seating area 30. The occupant seating area 30 is the area occupied by an occupant seated on the seat 12. The occupant seating area 30 is on a front side of the seat back 14 and on top of the seat bottom 16. The armrest assembly 28 may extend along the occupant seating area 30 to support the arm of the occupant and/or to control the kinematics of the occupant during a vehicle impact.

With reference to FIGS. 2 and 3, the armrest assembly 28 includes the armrest 24, the link 22, the track 20, the slider 18, and the pyrotechnic actuator 26. The armrest assembly 28 may include a net, as described further below. The armrest assembly 28 is on side of the seat 12. Specifically, the armrest assembly 28 may be outward of a lateral end of the seat bottom 16. The armrest assembly 28 may be vehicle-inboard of the seat bottom 16. For example, for a left seat 12 in a forward-facing position, the armrest assembly 28 may be inboard of a right side of the seat bottom 16.

The armrest 24 is moveable up to the raised position and down to the lowered position. The armrest 24 may be generally horizontal. Specifically, the armrest 24 may be elongated along an armrest axis B in a generally horizontal plane so that an occupant of the seat 12 may rest a forearm on the armrest 24. The armrest 24 is generally horizontal in that the armrest 24 may deviate slightly from true horizontal, e.g., for occupant ergonomics, and in any event is suitably angled to support the forearm of the occupant. As an example, the armrest 24 when generally horizontal may be elongated horizontally along the seat-bottom axis A or +/−15 degrees from horizontal along the seat-bottom axis A.

The armrest 24 may be generally horizontal in both the raised position and the lowered position. The armrest 24 may remain generally horizontal as the armrest 24 moves between the raised and the lowered positions. The armrest axis B in the raised position may be parallel to the armrest axis B in the lowered position.

The armrest 24 may move generally vertically between the raised position and the lowered position (specifically, from the raised position to the lowered position and from the lowered position to the raised position), i.e., without movement in the seat-forward direction F, the seat-rearward direction, the seat-outboard direction, or the seat-inboard direction. The vertical movement of the armrest 24 may slightly deviate from true vertical for example, due to manufacturing constraints, packaging constraints, manufacturing and assembly tolerances etc. As an example, generally vertical movement of the armrest 24 between the raised position and the lowered position may be vertical or +/−15 degrees from vertical.

The armrest 24 may include a frame (not numbered) and a covering (not numbered) supported on the frame. The frame may be rigid relative to the cover. The frame may be of any suitable material, e.g., plastic such as carbon fiber reinforced plastic (CFRP), glass fiber-reinforced semi-finished thermoplastic composite (organosheet), etc.; and/or metal such as steel, aluminum, etc. The covering may include upholstery and padding. The upholstery may be cloth, leather, faux leather, or any other suitable material. The padding may be between the covering and the seat 12 back frame and may be foam or any other suitable material.

The armrest assembly 28 includes at least one link 22. The link 22 is pivotally engaged with the armrest 24 and the armrest 24. Specifically, a pivotable joint 32 between the link 22 and the armrest 24 and between the link 22 and the slider 18 is described further below. In the example shown in the Figures, the armrest 24 includes two links 22, i.e., a first link 22 and a second link 22. In such an example, both links 22 may be pivotally connected to both the armrest 24 and the slider 18. In such an example, as shown in the Figures, the second link 22 may be in a seat-forward direction F of the first link 22 at the slider 18 and at the armrest 24. In other words, the first link 22 does not cross the second link 22. The armrest assembly 28 may include any suitable number of links 22, i.e., one or more.

The link 22 is designed to support the weight of the arm of the occupant when the occupant rests an arm on the armrest 24 when the armrest 24 is in the raised position. The link 22 may also be designed to support the weight of the occupant in the event the occupant leans on the armrest 24 when the armrest 24 is in the raised position during vehicle ingress and egress. Specifically, the link 22 is of the size, shape, and material to support these weights during resting of the arm on the armrest 24 and/or vehicle ingress and egress. In examples that include more than one link 22, the links 22, in combination may be designed accordingly. The link 22 may be straight, as shown in the Figures, or may be of any suitable shape. The link 22 may be metal, plastic, or any suitable material type. In examples including more than one link 22, the links 22 may have the same or different shape, material type, etc.

The link 22 is rotatable relative to armrest 24 and slider 18 about the pivotable joints 32, as described further below. Specifically, the link 22 rotates between an upright position and a lowered position. The link 22 is the lowered position, as shown in FIG. 2, when the armrest 24 is in the lowered position, and the link 22 is in the upright position, as shown in FIG. 3, when the armrest 24 is in the raised position. In examples including more than one link 22 the links 22 may move in unison. The links 22 may be generally vertical when in the upright position.

The track 20 may include a releasable lock 36, described further below, to selectively restrain movement of the slider 18 relative to the track 20, e.g., to releasably lock the armrest 24 in the raised position. The track 20 may be fixed relative to the seat bottom 16. For example, the track 20 may be directly connected to the seat bottom 16, e.g., the frame of the seat bottom 16, with, for example, welds, fasteners, etc. The track 20 may be elongated along the seat-bottom axis A.

The slider 18 is slidably engaged with the track 20 along the seat-bottom axis A, i.e., a path parallel to the seat-bottom axis A. Specifically, the track 20 guides movement of the slider 18 along the path. The track 20 may include a channel 38 that receives the slider 18. The channel 38 may be elongated along the seat-bottom axis A. The channel 38 may be shaped to slidably engage the slider 18 in the channel 38. For example, the channel 38 may include lips that retain the slider 18 in the channel 38 and allow the slider 18 to slide along the channel 38. The channel 38 may be, for example, a C-shaped channel 38, as shown in the Figures. In such an example, the slider 18 is sized and shaped to slidably engage the track 20 in the channel 38. The slider 18 and/or the channel 38 may include friction reducing components therebetween, e.g., nylon guides, bearings, etc.

The slider 18 may be elongated along channel 38. The slider 18 and the track 20 may be of any suitable material, for example, metal, plastic, etc.

The slider 18 is slidable along the track 20 between a rearward position, as shown in FIG. 2, and a forward position, as shown in FIG. 3. In the example shown in the Figures, the link 22 is in the upright when the slider 18 is in the forward position and the link 22 is in the lowered position when the slider 18 is in the rearward position. The armrest 24 is generally horizontal when the slider 18 is the rearward position, the forward position, and positions between the rearward position and the forward position. In other examples, the link 22 may be in the upright position when the slider 18 is in the rearward position and the link 22 may be in the lowered position when the slider 18 is in the rearward position. In such examples, the armrest assembly 28 may be a mirror image of that shown in the Figures and may operate in mirror.

The releasable lock 36 releasably locks the slider 18 in the forward position to maintain the armrest 24 in the raised position for supporting the arm of the occupant. Specifically, in a locked position releasable lock 36 maintains the slider 18 in the forward position when the slider 18 is in the forward position. In an unlocked position, the releasable lock 36 allows the slider 18 to move from the forward position toward the rearward position to allow the armrest 24 to move from the raised position toward the lowered position.

As an example, the releasable lock 36 may include a locking tab 40 releasably extending from the track 20 toward the slider 18. Specifically, the locking tab 40 extends from the track 20 into the channel 38. The locking tab 40 releasably engages the slider 18 when the slider 18 is in a forward position and the locking tab 40 is releasable to disengage the slider 18 to allow the slider 18 to move toward the rearward position. Specifically, track 20 may include an orifice 42 that receives the locking tab 40. The orifice 42 and the locking tab 40 are designed, i.e., sized, shaped, etc., so that the locking tab 40 is extendable from the orifice 42 into the channel 38 and is retractable from the channel 38 into the orifice 42.

The releasable lock 36 may include a spring 44 that biases the locking tab 40 into the channel 38. In other words, when the locking tab 40 is retracted into the orifice 42, the spring 44 exerts force on the locking tab 40 toward the channel 38.

The releasable lock 36 may include a release to retract the locking tab 40 into the orifice 42. For example, the release could be a mechanical release, e.g., a push button, lever, and/or Bowden cable 56, etc., that allows the occupant of the seat 12 to retract the locking tab 40 into the orifice 42 against the bias of the spring 44. As another example, the releasable lock 36 may include an electronic release, e.g., a solenoid, that retracts the locking tab 40 into the orifice 42 in response to input from the occupant of the seat 12, e.g., with a switch. In such an example, the locking tab 40 may be the armature the solenoid and the spring 44 may be the spring 44 of the armature. In the example shown in the Figures, the releasable lock 36 may include two locking tabs 40 opposing each other. In other examples, the releasable lock 36 may include any suitable number of locking tabs 40, i.e., one or more.

With reference to FIGS. 4 and 5, the slider 18 may include a protrusion 48 that is engaged by the locking tab 40. Specifically, the protrusion 48 is positioned along the slider 18 to engage the locking tab 40 when the slider 18 is in the forward position. In such an example, the protrusion 48 is seat 12 rearward of the locking tab 40 when the slider 18 is rearward of the forward position.

With reference to FIGS. 2-3 and 6-7, the armrest assembly 28 includes a pin 48 that engages the link 22 to force the link 22 to rotate to the upright position as the slider 18 moves toward the forward position. The pin 48 may be fixed relative to the track 20, e.g., connected to the track 20, connected to the seat bottom 16 in fixed position relative to the track 20, etc. The link 22 is movable with the slider 18 on the path of the slider 18 along the seat-bottom axis A. The pin 48 is fixed relative to the track 20 on the path. Accordingly, when the link 22 abuts the pin 48, the link 22 rotates to the upright position as the slider 18 continues to slide to the forward position. The pin 48 is positioned relative to the track 20 to position the link 22 in the upright position when the slider 18 is in the forward position. With reference to FIGS. 4-7, the protrusion 48 is in a seat-rearward direction of the locking tab 40 when the link 22 is spaced from the pin 48, and the locking tab 40 is in a seat-forward direction F of the protrusion 48 when the link 22 abuts the pin 48.

As set forth above, pivotable joints 32 may connect the link 22 to the armrest 24 and/or to the slider 18. In the example shown in the Figures, the armrest assembly 28 includes four pivotable joints 32, specifically two for each link 22 at both the armrest 24 and the slider 18. The pivotable joints 32 allow the link 22 to rotate relative to the armrest 24 and the slider 18 as the slider 18 moves slides along the track 20 and the armrest 24 moves between the raised and lowered positions.

Figure 6:
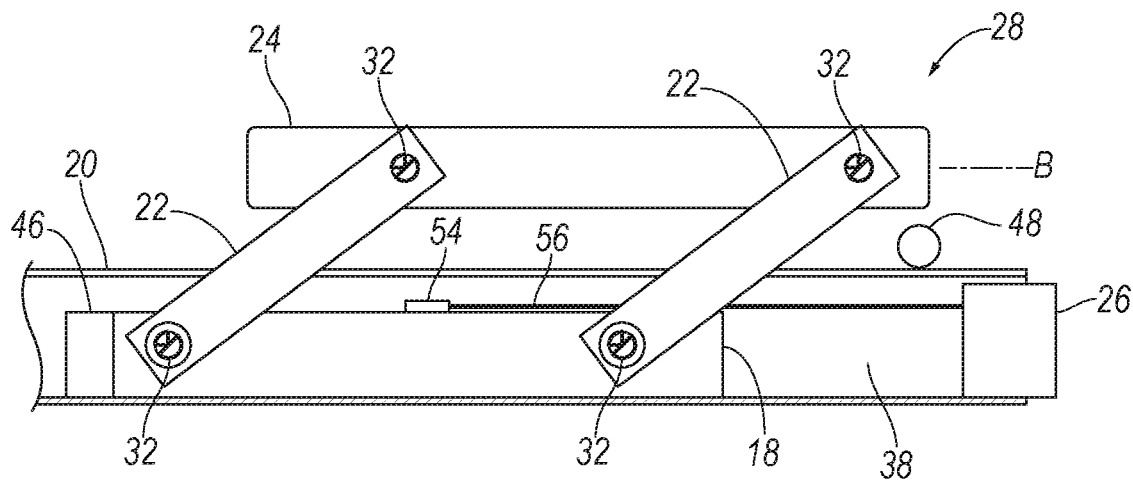
FIG. 6 is a side view and partially cut away view of FIG. 4.
Figure 7:
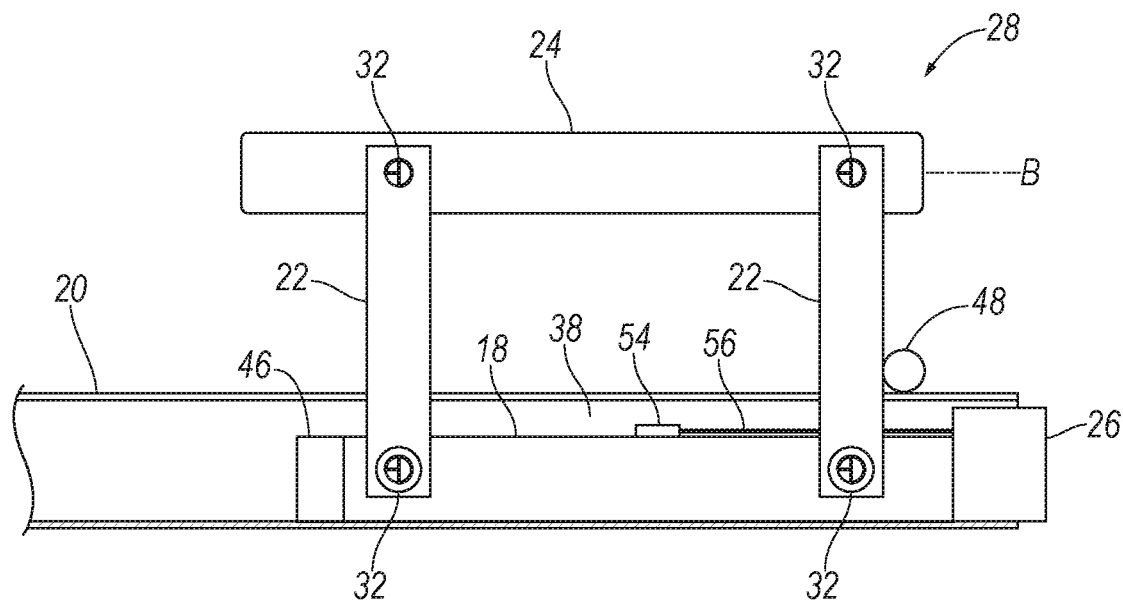
FIG. 7 is a side view and partially cut away view of FIG. 5.

At least one of the pivotable joints 32 may be designed to prevent rearward rotation of the link 22 when the link 22 is in the upright position. As an example, the pivotable joint 32 may have having stopping surfaces 50 spaced from each other when the link 22 is in the lowered position and abutting each other when the link 22 is in the upright position. Specifically, one of the stopping surfaces 50 is fixed relative to the link 22 and the other of the stopping surfaces 50 is fixed relative to the one of the slider 18 and the armrest 24, as shown in FIGS. 6 and 7. When the stopping surfaces 50 abut each other, the stopping surfaces 50 prevent rotation of the link 22 in one direction and allows rotation of the link 22 in the other direction.

The pyrotechnic actuator 26 moves the armrest 24 to the raised position in response to detection of a vehicle impact. Specifically, in the event a vehicle impact is detected, the pyrotechnic actuator 26 is actuated to pull the slider 18 relative to the track 20 to the forward position, which rotates the link 22 to the upright position and raises the armrest 24 to the raised position.

The pyrotechnic actuator 26 is mounted in fixed position relative to the track 20 and is connected to the slider 18. For example, the pyrotechnic actuator 26 may include housing, e.g., fixed to the frame of the seat bottom 16, and a cable 56 that extends from the housing to the slider 18. In the example shown in the Figures, the pyrotechnic actuator 26 is seat forward of the track 20.

The slider 18 may define a slot 52 and the pyrotechnic actuator 26 may have an anchor 54 slidably retained in the slot 52. The slot 52 is elongated along the channel 38. The cable 56 is connected to the slot 52. The slot 52 allows the slider 18 to freely slide along the channel 38 without interference from the pyrotechnic actuator 26 in use absent a vehicle impact. In the event of a vehicle impact, the pyrotechnic charge is actuated to retract the cable 56. As the cable 56 is retracted, the anchor 54 slides along the slot 52 and reaches an end of the slot 52, at which point the anchor 54 and the cable 56 pull the slider 18 to the forward position.

The pyrotechnic actuator 26 includes a pyrotechnic charge. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2). The pyrotechnic actuator 26 may be, specifically, a rotary pyrotechnic actuator 26. In such an example, ignition of the pyrotechnic charge spin 48s a spool of the pyrotechnic actuator 26 and the cable 56 is wrapped around the spool.

The armrest assembly 28 may include a net 58 connected to the armrest 24 and extending downwardly from the armrest 24 along the occupant seating area 30. The net 58 may be connected to the seat bottom 16 and/or the track 20. In the example shown in the Figures, the armrest assembly 28 includes a mounting plate 60 connected to the seat bottom 16 and to the net 58. The net 58 is sized so that the net 58 is unfolded when the armrest 24 is in the raised position. When the armrest 24 is lowered to the lowered position, the net 58 folds and/or is collected adjacent the seat bottom 16. The net is flexible relative to the armrest 24. The net 58 may control the kinematics of an occupant during a vehicle impact. The net 58 may be, for example, fabric. For example, the net may be woven nylon.

Figure 8:
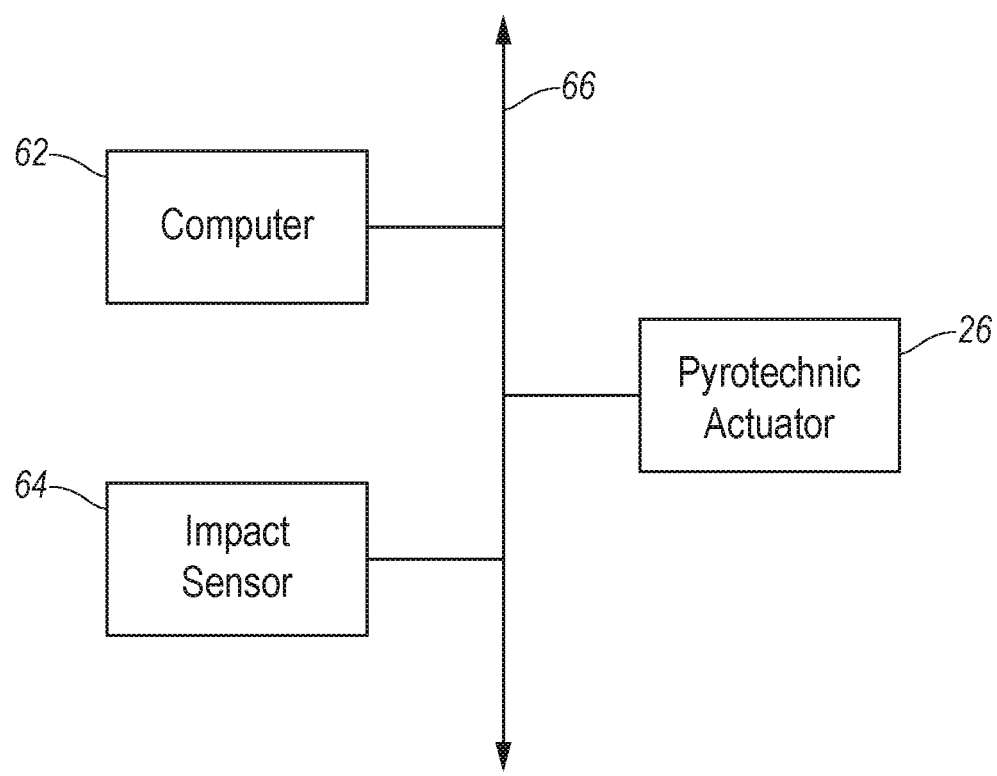
FIG. 8 is a block diagram of a system of the vehicle.

With reference to FIG. 8, the vehicle 10 includes a computer 62. The computer 62 includes a processor and a memory such as are known. The memory includes one or more forms of computer 62 readable media, and stores instructions executable by the computer 62 for performing various operations, including as disclosed herein. The computer 62 controls the pyrotechnic device to control the position of the armrest 24 during a detected vehicle impact. The computer 62 may include or be communicatively coupled to, e.g., via a network of the vehicle 10 such as a communication network 66, more than one processor, e.g., included in components such as sensors, electronic controller units (ECUs) or the like included in the vehicle 10. The computer 62 is arranged for communications on the communication network 66 that can include a bus in the vehicle 10 such as a controller area network (CAN) or the like, and/or other wired and/or wireless mechanisms. Via the communication network 66, the computer 62 may transmit messages to various devices in the vehicle 10 and/or receive messages (e.g., CAN messages) from the various devices, e.g., sensors, an actuator, a human machine interface (HMI), etc. Alternatively, or additionally, in cases where the computer 62 actually comprises a plurality of devices, the communication network 66 may be used for communications between devices represented as the computer 62 in this disclosure. Further, as mentioned below, various controllers and/or sensors may provide data to the computer 62 via the vehicle 10 communication network 66.

With continued reference to FIG. 8, the vehicle 10 may include at least one impact sensor 64 for sensing impact of the vehicle 10. The computer 62 may activate the pyrotechnic actuator 26, e.g., provide an impulse to a pyrotechnic charge, when the impact sensor 64 senses an impact of the vehicle 10. Alternatively, or additionally to sensing impact, the impact sensor 64 may be configured to sense impact prior to impact, i.e., pre-impact sensing. The impact sensor 64 may be in communication with the computer 62. The impact sensor 64 is configured to detect an impact to the vehicle 10. The impact sensor 64 may be of any suitable type, for example, post-contact sensors such as accelerometers, pressure sensors, and contact switches; and pre-impact sensor 64s such as radar, LIDAR, and vision-sensing systems. The vision-sensing systems may include one or more cameras, CCD image sensors, CMOS image sensors, etc. The impact sensor 64 may be located at numerous points in or on the vehicle 10.

With continued reference to FIG. 8, the vehicle 10 includes the communication network 66. The communication network 66 can include a bus in the vehicle 10 such as a controller area network (CAN) or the like, and/or other wired and/or wireless mechanisms. Via the network, the computer 62 may transmit messages to various devices in the vehicle 10 and/or receive messages (e.g., CAN messages) from the various devices, e.g., sensors, an actuator, a human machine interface (HMI), etc. Alternatively, or additionally, in cases where the computer 62 actually comprises a plurality of devices, the communication network 66 may be used for communications between devices represented as the computer 62 in this disclosure. Various controllers and/or sensors may provide data to the computer 62 via the communication network 66.

In the event a vehicle impact is detected by the impact sensor 64, the computer 62 instructs the pyrotechnic actuator 26 to actuate in response to the detection of the vehicle impact by the impact sensor 64. As set forth above, when the pyrotechnic actuator 26 is actuated, the wire is retracted to pull the slider 18 to the forward position. As a result, the armrest 24 is raised to the raised position. In the raised position, the armrest 24 may act as a reaction surface for the occupant of the seat 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seat, comprising:
   a seat back and a seat bottom extending from the seat back along a seat-bottom axis;
   a track fixed relative to the seat bottom and elongated along the seat-bottom axis;
   a slider slidably engaged with the track along the seat-bottom axis;
   a link pivotally engaged with the slider;
   an armrest pivotally engaged with the link; and
   a pyrotechnic actuator connected to the slider.

2. The seat as set forth in claim 1, further comprising a second link pivotally engaged with the slider and the armrest.

3. The seat as set forth in claim 2, wherein the second link is in a seat-forward direction of the link at the slider and at the armrest.

4. The seat of claim 1, further comprising a pivotable joint between the link and one of the slider and the armrest, the link being pivotable about the pivotable joint between a lowered position and an upright position, the pivotable joint having stopping surfaces spaced from each other when the link is in the lowered position and abutting each other when the link is in the upright position.

5. The seat of claim 4, wherein one of the stopping surfaces is fixed relative to the link and the other of the stopping surfaces is fixed relative to the one of the slider and the armrest.

6. The seat as set forth in claim 1, wherein the link is movable with the slider on a path along the seat-bottom axis, and further comprising a pin fixed relative to the track on the path in a seat-forward direction of the link.

7. The seat of claim 6, further comprising a pivotable joint between the link and one of the slider and the armrest, the pivotable joint having stopping surfaces, the stopping surfaces being spaced from each other when the link is spaced from the pin and the stopping surfaces abutting each other when the link abuts the pin.

8. The seat as set forth in claim 7, further comprising a locking tab releasably extending from the track toward the slider, the slider including a protrusion, the protrusion being in a seat-rearward direction of the locking tab when the link is spaced from the pin, and the locking tab being in a seat-forward direction of the protrusion when the link abuts the pin.

9. The seat as set forth in claim 1, further comprising a locking tab releasably extending from the track toward the slider, the locking tab being releasably engaged with the slider when the slider is in a forward position and the locking tab being disengaged with the slider when the slider is in a rearward position.

10. The seat as set forth in claim 1, wherein the slider defines a slot and the pyrotechnic actuator has an anchor moveably retained in the slot.

11. The seat as set forth in claim 1, further comprising a net extending from the seat bottom to the armrest.

12. The seat as set forth in claim 1, wherein the slider is slidable along the track between a forward position and a rearward position, the link being upright when the slider is in the forward position and the link being in a lowered position when the slider is in the rearward position.

13. The seat as set forth in claim 12, wherein the armrest is generally horizontal when the slider is in the forward position.

14. The seat as set forth in claim 13, wherein the armrest is generally horizontal when the slider is in the rearward position.

15. The seat as set forth in claim 12, wherein the armrest is in a raised position when the link is in the upright position and the armrest is below the raised position when the link is in the lowered position.

* * * * *